(12) United States Patent
Haruta et al.

(10) Patent No.: US 11,226,578 B2
(45) Date of Patent: Jan. 18, 2022

(54) IMAGE FORMING APPARATUS INCLUDING GEAR TRAINS FOR TRANSMITTING DRIVING FORCE OF MOTOR TO EACH OF A PLURALITY OF DEVELOPING UNITS

(71) Applicant: BROTHER KOGYO KABUSHIKI KAISHA, Nagoya (JP)

(72) Inventors: Kotaro Haruta, Yokkaichi (JP); Hiroshi Nakano, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/030,722

(22) Filed: Sep. 24, 2020

(65) Prior Publication Data

US 2021/0011420 A1 Jan. 14, 2021

Related U.S. Application Data (63) Continuation of application No. PCT/JP2018/045629, filed on Dec. 12, 2018.

(30) Foreign Application Priority Data

Mar. 30, 2018 (JP) .............................. JP2018-067790

(51) Int. Cl.
*G03G 15/00* (2006.01)
*F16H 1/22* (2006.01)
*G03G 21/16* (2006.01)

(52) U.S. Cl.
CPC ............. *G03G 15/757* (2013.01); *F16H 1/22* (2013.01); *G03G 21/16* (2013.01)

(58) Field of Classification Search
USPC ........................................................ 399/328
See application file for complete search history.

(56) References Cited

U.S. PATENT DOCUMENTS 5,848,333 A * 12/1998 An ....................... G03G 15/757
399/167
2003/0138270 A1 7/2003 Matsuoka
(Continued)

FOREIGN PATENT DOCUMENTS

JP 11-15275 A 1/1999
JP 2000-250315 A 9/2000
(Continued)

OTHER PUBLICATIONS

International Preliminary Report on Patentability issued in corresponding International Patent Application No. PCT/JP2018/045629, dated Oct. 6, 2020.
(Continued)

*Primary Examiner* — Quana Grainger
(74) *Attorney, Agent, or Firm* — Merchant & Gould P.C.

(57) ABSTRACT

An image forming apparatus includes: a first gear train including a first clutch; a second gear train including a second clutch; a third gear train including a third clutch; a fourth gear train including a fourth clutch; a motor including an output shaft; an output gear rotatable with the output shaft; a fifth gear train connected to the first and second clutches; and a sixth gear train connected to the third and fourth clutches. The first clutch engages transmission of a driving force to a first developing unit, the second clutch engages transmission of a driving force to a second developing unit, the third clutch engages transmission of a driving force to a third developing unit, and the fourth clutch engages transmission of a driving force to a fourth developing unit. The fifth and sixth gear trains are connected to the output gear independently from each other.

5 Claims, 3 Drawing Sheets

(56) References Cited

U.S. PATENT DOCUMENTS

| | | | |
|---|---|---|---|
| 2006/0153595 A1 | 7/2006 | Yoon et al. | |
| 2007/0031166 A1 | 2/2007 | Zensai | |
| 2014/0008171 A1 | 1/2014 | Ishikawa | |
| 2014/0369704 A1* | 12/2014 | Matsumoto | G03G 15/043 399/53 |
| 2016/0349664 A1 | 12/2016 | Sawashima | |

FOREIGN PATENT DOCUMENTS

| | | |
|---|---|---|
| JP | 2001-147565 A | 5/2001 |
| JP | 2003-208024 A | 7/2003 |
| JP | 2005-156779 A | 6/2005 |
| JP | 2006-349763 A | 12/2006 |
| JP | 2007-65632 A | 3/2007 |
| JP | 2008-3249 A | 1/2008 |
| JP | 2008-40417 A | 2/2008 |
| JP | 2014-16432 A | 1/2014 |
| JP | 2015-1629 A | 1/2015 |
| JP | 2016-224418 A | 12/2016 |

OTHER PUBLICATIONS

International Search Report and Written Opinion issued in corresponding International Patent Application No. PCT/JP2018/045629, dated Mar. 5, 2019.

Office Action (Notice of Reasons for Refusal) issued in corresponding Japanese Patent Application No. 2018-067790, dated Nov. 16, 2021.

* cited by examiner

IMAGE FORMING APPARATUS INCLUDING GEAR TRAINS FOR TRANSMITTING DRIVING FORCE OF MOTOR TO EACH OF A PLURALITY OF DEVELOPING UNITS

CROSS REFERENCE TO RELATED APPLICATION

This is a by-pass continuation application of International Application No. PCT/JP2018/045629 filed Dec. 12, 2018 claiming priority from Japanese Patent Application No. 2018-067790 filed Mar. 30, 2018. The entire contents of the International Application and the priority application are incorporated herein by reference.

TECHNICAL FIELD

The present disclosure relates to an image forming apparatus.

BACKGROUND

A conventional image forming apparatus includes a first developing roller, a second developing roller, a third developing roller, a fourth developing roller, a first clutch, a second clutch, a third clutch, and a fourth clutch. The first clutch is configured to engage transmission of a driving force to the first developing roller, and to disengage the transmission of the driving force to the first developing roller. The second clutch is configured to engage transmission of a driving force to the second developing roller, and to disengage the transmission of the driving force to the second developing roller. The third clutch is configured to engage transmission of a driving force to the third developing roller, and to disengage the transmission of the driving force to the third developing roller. The fourth clutch is configured to engage transmission of a driving force to the fourth developing roller, and to disengage the transmission of the driving force to the fourth developing roller (see Japanese Patent Application Publication No. 2003-208024).

SUMMARY

In the conventional image forming apparatus described in Japanese Patent Application Publication No. 2003-208024, there is a demand of driving each of the first developing roller, the second developing roller, the third developing roller and the fourth developing roller using a single motor, and of halting the developing roller(s) that has been completed transfer of a toner image onto a printing sheet while continuing rotation of the developing roller(s) that has not yet completed transfer of a toner image onto the printing sheet during printing operation.

In this case, there is a possibility that torque fluctuation generated by switching operation of the clutches affect rotation of the developing roller that has not yet completed transfer of a toner image onto a printing sheet, which leads to disturbance of an image to be printed.

In view of the foregoing, it is an object of the present disclosure to provide an image forming apparatus capable of restraining occurrence of disturbance of an image to be printed when a first developing roller, a second developing roller, a third developing roller, and a fourth developing roller are individually halted during printing operation.

In order to attain the above and other objects, according to one aspect, the disclosure provides an image forming apparatus including: a first gear train; a second gear train; a third gear train; a fourth gear train; a motor; an output gear; a fifth gear train; and a sixth gear train. The first gear train includes: a first joint; and a first clutch. The first joint is connected to a first developing unit including a first developing roller. The first joint includes a first joint gear. The first clutch is configured to switch power transmission status between a first engaging state where the first clutch engages transmission of a driving force to the first joint gear and a first disengaging state where the first clutch disengages the transmission of the driving force to the first joint gear. The second gear train includes: a second joint; and a second clutch. The second joint is connected to a second developing unit including a second developing roller. The second joint includes a second joint gear. The second clutch is configured to switch power transmission status between a second engaging state where the second clutch engages transmission of a driving force to the second joint gear and a second disengaging state where the second clutch disengages the transmission of the driving force to the second joint gear. The third gear train includes: a third joint; and a third clutch. The third joint is connected to a third developing unit including a third developing roller. The third joint includes a third joint gear. The third clutch is configured to switch power transmission state between a third engaging state where the third clutch engages transmission of a driving force to the third joint gear and a third disengaging state where the third clutch disengages the transmission of the driving force to the third joint gear. The fourth gear train includes: a fourth joint; and a fourth clutch. The fourth joint is connected to a fourth developing unit including a fourth developing roller. The fourth joint includes a fourth joint gear. The fourth clutch is configured to switch power transmission state between a fourth engaging state where the fourth clutch engages transmission of a driving force to the fourth joint gear and a fourth disengaging state where the fourth clutch disengages the transmission of the driving force to the fourth joint gear. The motor includes an output shaft. The output gear is rotatable together with the output shaft. The fifth gear train is connected to the output gear. The fifth gear train is connected to the first clutch and the second clutch. The sixth gear train is connected to the output gear independently from the fifth gear train. The sixth gear train is connected to the third clutch and the fourth clutch.

According to another aspect, the disclosure provides an image forming apparatus including: a motor; an output shaft; a first gear train; and a second gear train. The motor includes an output shaft. The output gear is rotatable together with the output shaft. The first gear train connects the output gear to a first developing unit including a first developing roller. The first gear train includes a first clutch configured to switch power transmission state between a first engaging state where the first clutch engages transmission of the driving force from the motor to the first developing unit and a first disengaging state where the first clutch disengages the transmission of the driving force. The second gear train is independent from the first gear train and connects the output gear to a second developing unit including a second developing roller. The second gear train includes a second clutch configured to switch power transmission state between a second engaging state where the second clutch engages transmission of the driving force from the motor to the second developing unit and a second disengaging state where the second clutch disengages the transmission of the driving force.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

<1. Overview of Image Forming Apparatus>

An overview of an image forming apparatus will be described with reference to FIG. 1.

An image forming apparatus 1 includes a main body casing 2, a sheet supply tray 3, four photosensitive drums 4Y, 4M, 4C and 4K, four chargers 5Y, 5M, 5C and 5K, an exposure unit 6, four developing units 7Y, 7M, 7C and 7K, a transfer unit 8, and a fixing unit 9.

<1.1 Main Body Casing>

The main body casing 2 constitutes an outer shell of the image forming apparatus 1. The main body casing 2 accommodates therein the sheet supply tray 3, the four photosensitive drums 4Y, 4M, 4C and 4K, the four chargers 5Y, 5M, 5C and 5K, the exposure unit 6, the four developing units 7Y, 7M, 7C and 7K, the transfer unit 8, and the fixing unit 9.

<1.2 Sheet Supply Tray>

The sheet supply tray 3 accommodates therein printing mediums S. The printing medium S in the sheet supply tray 3 is conveyed toward the photosensitive drum 4Y. The printing medium S is for example, a printing sheet.

<1.3 Four Photosensitive Drums>

The four photosensitive drums 4Y, 4M, 4C and 4K are arrayed in a conveying direction in which the printing medium S is conveyed by a conveyer belt 11. The conveyer belt 11 will be described later. The photosensitive drum 4M is positioned downstream of the photosensitive drum 4Y in the conveying direction. The photosensitive drum 4C is positioned downstream of the photosensitive drum 4M in the conveying direction. The photosensitive drum 4K is positioned downstream of the photosensitive drum 4C in the conveying direction. That is, the four photosensitive drums 4Y, 4M, 4C and 4K are arrayed in the order of the photosensitive drum 4Y, the photosensitive drum 4M, the photosensitive drum 4C and the photosensitive drum 4K in the conveying direction.

The photosensitive drum 4Y is rotatable about a drum axis extending in an axial direction. The axial direction is a direction crossing the conveying direction. Preferably, the axial direction is perpendicular to the conveying direction. The photosensitive drum 4Y extends in the axial direction and has a hollow cylindrical shape. Note that each of the photosensitive drums 4M, 4C and 4K has a configuration the same as the configuration of the photosensitive drum 4Y. Accordingly, description as to the configuration of each of the photosensitive drums 4M, 4C and 4K will be omitted.

<1.4 Four Chargers>

The charger 5Y is configured to charge a circumferential surface of the photosensitive drum 4Y. The charger 5M is configured to charge a circumferential surface of the photosensitive drum 4M. The charger 5C is configured to charge a circumferential surface of the photosensitive drum 4C. The charger 5K is configured to charge a circumferential surface of the photosensitive drum 4K. Specifically, each of these four chargers 5Y, 5M, 5C and 5K is a scorotron charger. Note that each of these four chargers 5Y, 5M, 5C and 5K may be a charge roller.

<1.5 Exposure Unit>

The exposure unit 6 is configured to expose the photosensitive drum 4Y to light. After the circumferential surface of photosensitive drum 4Y is electrically charged by the charger 5Y, the exposure unit 6 irradiates the circumferential surface of the photosensitive drum 4Y that has been electrically charged with light for exposure, thereby forming an electrostatic latent image on the circumferential surface of the photosensitive drum 4Y. Specifically, the exposure unit 6 is a laser scanner unit that scans the circumferential surface of the photosensitive drum 4Y with laser beam. Alternatively, an LED unit including an LED array can be employed as the exposure unit 6. The exposure unit 6 is also configured to expose the photosensitive drums 4M, 4C and 4K to lights.

<1.6 Four Developing Units>

The developing unit 7Y is configured to accommodate therein toner. The developing unit 7Y may be a developing cartridge attachable to the image forming apparatus 1. The developing unit 7Y includes a developing roller 10Y.

The developing roller 10Y is rotatable about a developing roller axis extending in the axial direction. The developing roller 10Y extends in the axial direction and has a solid cylindrical shape. The developing roller 10Y has a portion accommodated inside the developing unit 7Y. The developing roller 10Y contacts the circumferential surface of the photosensitive drum 4Y. With this configuration, the developing roller 10Y can supply toner in the developing unit 7Y to the circumferential surface of the photosensitive drum 4Y. As the toner in the developing unit 7Y to the circumferential surface of the photosensitive drum 4Y through the developing roller 10Y, the electrostatic latent image is developed, whereby a toner image is formed on the circumferential surface of the photosensitive drum 4Y.

Note that the developing unit 7M includes a developing roller 10M. The developing unit 7C includes a developing roller 10C. The developing unit 7K includes a developing roller 10K. The developing roller 10M contacts the circumferential surface of the photosensitive drum 4M. Hence, the developing roller 10M can supply toner in the developing unit 7M to the circumferential surface of the photosensitive drum 4M. The developing roller 10C contacts the circumferential surface of the photosensitive drum 4C. Therefore, the developing roller 10C can supply toner in the developing unit 7C to the circumferential surface of the photosensitive drum 4C. The developing roller 10K contacts the circumferential surface of the photosensitive drum 4K. Accordingly, the developing roller 10K can supply toner in the developing unit 7K to the circumferential surface of the photosensitive drum 4K.

<1.7 Transfer Unit>

The transfer unit 8 includes the conveyer belt 11. That is, the image forming apparatus 1 includes the conveyer belt 11. The conveyer belt 11 is configured to convey the printing medium S supplied from the sheet supply tray 3 toward the fixing unit 9. The printing medium S conveyed by the conveyer belt 11 passes through a portion between the conveyer belt 11 and the four photosensitive drums 4Y, 4M, 4C and 4K. At this time, the transfer unit 8 transfers the toner images formed on the respective four photosensitive drums 4Y, 4M, 4C and 4K onto the printing medium S.

<1.8 Fixing Unit>

The fixing unit 9 is configured to apply heat and pressure to the printing medium S onto which the toner images have been transferred to fix the toner images to the printing medium S. The printing medium S moved past the fixing unit 9 is discharged on an upper surface of the main body casing 2.

<2. Details of Image Forming Apparatus>

Next, details of the image forming apparatus 1 will be described with reference to FIGS. 2 and 3.

Figure 1:
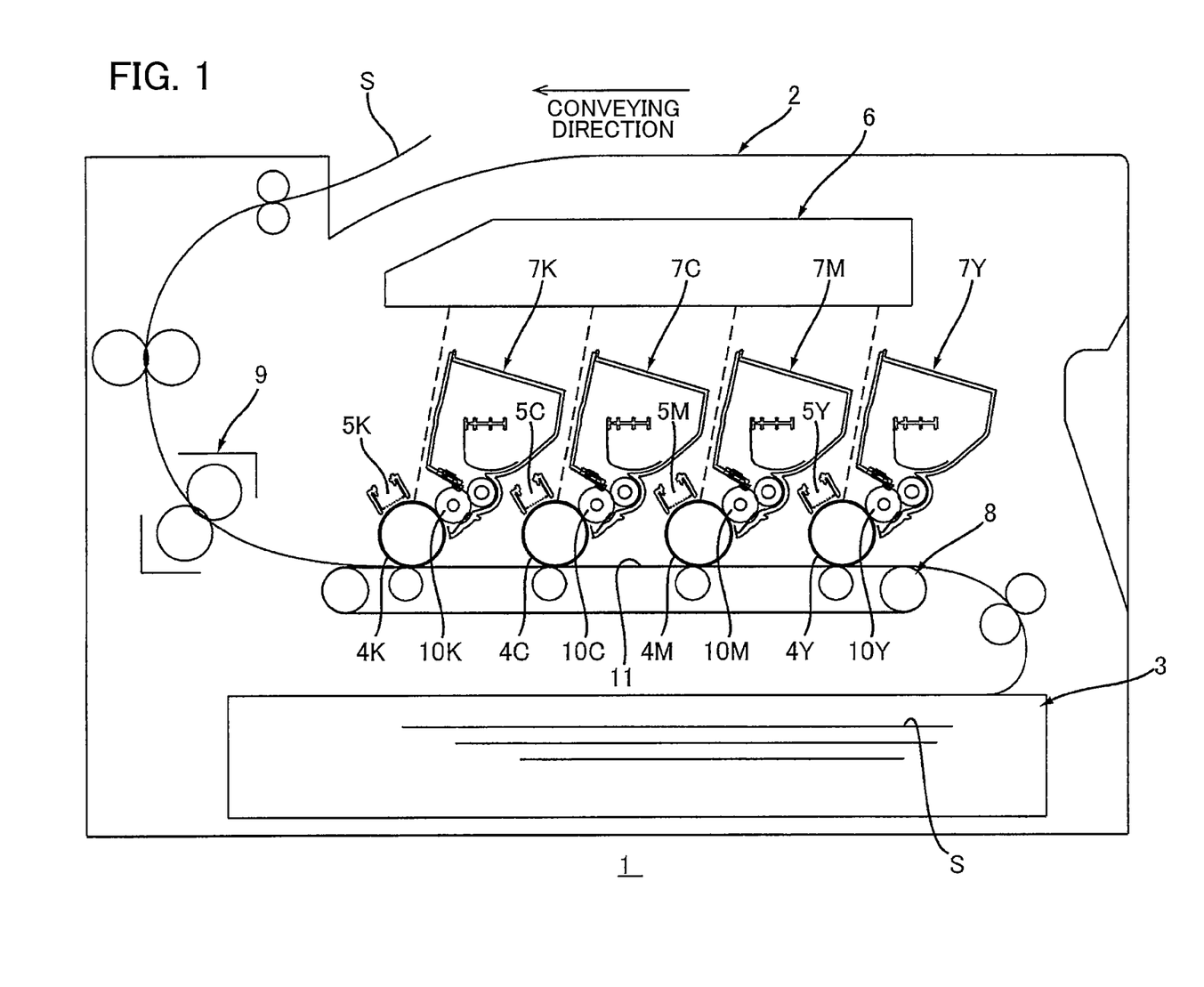
FIG. 1 is a schematic diagram illustrating a configuration of an image forming apparatus.
Figure 2:
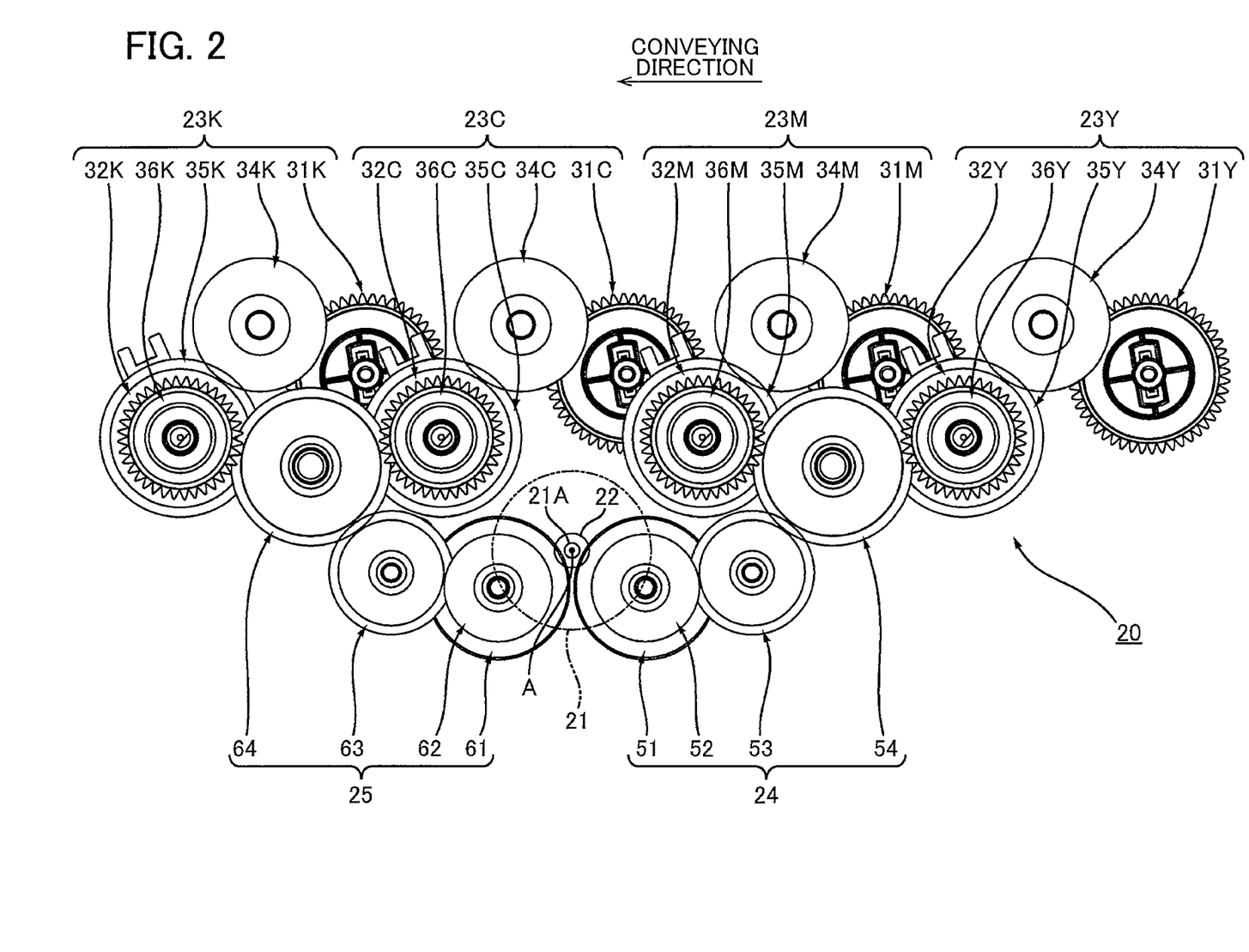
FIG. 2 illustrates gear trains for transmitting a driving force of a motor to each of four developing units illustrated in FIG. 1.

As illustrated in FIG. 2, the image forming apparatus 1 includes a motor 21, and gear trains 20 configured to transmit a driving force of the motor 21 to each of the four developing units 7Y, 7M, 7C and 7K (see FIG. 1).

<2.1 Motor>

Specifically, the motor 21 is a brushless DC motor. The motor 21 includes an output shaft 21A. The output shaft 21A extends in the axial direction. The output shaft 21A is rotatable about an axis A extending in the axial direction.

<2.2 Gear Trains>

The gear trains 20 include an output gear 22, a first gear train 23Y, a second gear train 23M, a third gear train 23C, a fourth gear train 23K, a fifth gear train 24, and a sixth gear train 25. That is, the image forming apparatus 1 includes the output gear 22, the first gear train 23Y, the second gear train 23M, the third gear train 23C, the fourth gear train 23K, the fifth gear train 24, and the sixth gear train 25.

The first gear train 23Y is configured to transmit a driving force of the motor 21 to the developing unit 7Y (see FIG. 1). The second gear train 23M is configured to transmit the driving force of the motor 21 to the developing unit 7M (see FIG. 1). The third gear train 23C is configured to transmit the driving force of the motor 21 to the developing unit 7C (see FIG. 1). The fourth gear train 23K is configured to transmit the driving force of the motor 21 to the developing unit 7K (see FIG. 1). Each of the first gear train 23Y, the second gear train 23M, the third gear train 23C, and the fourth gear train 23K includes a clutch. Specifically, the first gear train 23Y includes a first clutch 32Y, the second gear train 23M includes a second clutch 32M, the third gear train 23C includes a third clutch 32C, and the fourth gear train 23K includes a fourth clutch 32K. Each of the first clutch 32Y, the second clutch 32M, the third clutch 32C, and the fourth clutch 32K is configured to be switched individually between a state in which transmission of the driving force is engaged and a state in which the transmission of the driving force is disengaged.

The fifth gear train 24 is connected to the first clutch 32Y and the second clutch 32M. The sixth gear train 25 is connected to the third clutch 32C and the fourth clutch 32K. The fifth gear train 24 and the sixth gear train 25 are connected to the output gear 22 independently from each other.

The above configuration can restrain transmission of torque fluctuation occurring by switching operation of each of the first clutch 32Y and the second clutch 32M to the third gear train 23C and the fourth gear train 23K.

Also, the above configuration can restrain transmission of torque fluctuation occurring by switching operation of each of the third clutch 32C and the fourth clutch 32K to the first gear train 23Y and the second gear train 23M.

Next, the configuration of the gear trains 20 will be described in detail.

<2.2.1 Output Gear>

The output gear 22 is coupled to the output shaft 21A. The output gear 22 is rotatable together with the output shaft 21A.

<2.2.2 First Gear Train>

The first gear train 23Y is connected to the developing unit 7Y. As illustrated in FIGS. 2 and 3, the first gear train 23Y includes a first joint 31Y, the first clutch 32Y, and a plurality of idle gears 33Y, 34Y, 35Y and 36Y.

The first joint 31Y is connected to the developing unit 7Y. The first joint 31Y is rotatable about an axis A1. The axis A1 extends in the axial direction. The first joint 31Y includes a first joint gear 41Y and a coupling 42Y. The first joint gear 41Y is rotatable about the axis A1. The coupling 42Y is rotatable together with the first joint gear 41Y about the axis A1. The coupling 42Y extends in the axial direction.

The coupling 42Y is coupled to a developing coupling of the developing unit 7Y. The developing coupling is not illustrated. The coupling 42Y is rotatable together with the developing coupling about the axis A1 in a state where the coupling 42Y is coupled to the developing coupling. Hence, the first joint 31Y can transmit a driving force to the developing unit 7Y while the coupling 42Y is coupled to the developing coupling.

The first clutch 32Y is positioned in the middle of the first gear train 23Y. Specifically, the first clutch 32Y is disposed between the idle gear 35Y and the idle gear 36Y. The first clutch 32Y is configured to switch power transmission state between a first engaging state and a first disengaging state. The first clutch 32Y engages transmission of a driving force to the first joint gear 41Y when the first clutch 32Y is in the first engaging state. The first clutch 32Y disengages the transmission of the driving force to the first joint gear 41Y when the first clutch 32Y is in the first disengaging state.

Specifically, the first clutch 32Y is an electromagnetic clutch. The first clutch 32Y is configure to be switched between an ON state and an OFF state. The first clutch 32Y becomes the first engaging state when the first clutch 32Y is in the ON state. The first clutch 32Y becomes the first disengaging state when the first clutch 32Y is in the OFF state.

The idle gear 33Y is in meshing engagement with the first joint gear 41Y. The idle gear 34Y is rotatable together with the idle gear 33Y. The idle gear 35Y is in meshing engagement with the idle gear 34Y. The idle gear 36Y is rotatable together with the idle gear 35Y when the first clutch 32Y is in the ON state.

<2.3 Second Gear Train>

The second gear train 23M is connected to the developing unit 7M. The second gear train 23M includes a second joint 31M, the second clutch 32M, and a plurality of idle gears 33M, 34M, 35M and 36M.

The second joint 31M is connected to the developing unit 7M. The second joint 31M is rotatable about an axis A2. The axis A2 extends in the axial direction. The second joint 31M includes a second joint gear 41M rotatable about the axis A2. The second joint 31M has a configuration the same as that of the first joint 31Y, and the above description as to the first joint 31Y can be applied to the second joint 31M.

Therefore, description as to the configuration of the second joint 31M will be omitted.

The second clutch 32M is positioned in the middle of the second gear train 23M. Specifically, the second clutch 32M is disposed between the idle gear 35M and the idle gear 36M. The second clutch 32M is configured to switch power transmission status between a second engaging state and a second disengaging state. The second clutch 32M engages transmission of a driving force to the second joint gear 41M when the second clutch 32M is in the second engaging state. The second clutch 32M disengages the transmission of the driving force to the second joint gear 41M when the second clutch 32M is in the second disengaging state.

Specifically, the second clutch 32M is an electromagnetic clutch. The second clutch 32M is configured to be switched between an ON state and an OFF state. The second clutch 32M becomes the second engaging state when the second clutch 32M is in the ON state. The second clutch 32M becomes the second disengaging state when the second clutch 32M is in the OFF state.

The idle gear 33M is in meshing engagement with the second joint gear 41M. The idle gear 34M is rotatable together with the idle gear 33M. The idle gear 35M is in meshing engagement with the idle gear 34M. The idle gear 36M is rotatable together with the idle gear 35M when the second clutch 32M is in the ON state.

<2.4 Third Gear Train>

The third gear train 23C is connected to the developing unit 7C. The third gear train 23C includes a third joint 31C, the third clutch 32C, and a plurality of idle gears 33C, 34C, 35C and 36C.

The third joint 31C is connected to the developing unit 7C. The third joint 31C is rotatable about an axis A3. The axis A3 extends in the axial direction. The third joint 31C includes a third joint gear 41C rotatable about the axis A3. The third joint 31C has a configuration the same as that of the first joint 31Y, and the above description as to the first joint 31Y is applicable.

Hence, description as to the configuration of the third joint 31C will be omitted.

The third clutch 32C is positioned in the middle of the third gear train 23C. Specifically, the third clutch 32C is disposed between the idle gear 35C and the idle gear 36C. The third clutch 32C is configured switch power transmission status between a third engaging state and a third disengaging state. The third clutch 32C engages transmission of a driving force to the third joint gear 41C when the third clutch 32C is in the third engaging state. The third clutch 32C disengages the transmission of the driving force to the third joint gear 41C when the third clutch 32C is in the third disengaging state.

Specifically, the third clutch 32C is an electromagnetic clutch. The third clutch 32C is configured to be switched between an ON state and an OFF state. The third clutch 32C becomes the third engaging state when the third clutch 32C is in the ON state. The third clutch 32C becomes the third disengaging state when the third clutch 32C is in the OFF state.

The idle gear 33C is in meshing engagement with the third joint gear 41C. The idle gear 34C is rotatable together with the idle gear 33C. The idle gear 35C is in meshing engagement with the idle gear 34C. The idle gear 36C is rotatable together with the idle gear 35C when the third clutch 32C is in the ON state.

<2.5 Fourth Gear Train>

The fourth gear train 23K is connected to the developing unit 7K. The fourth gear train 23K includes a fourth joint 31K, the fourth clutch 32K, and a plurality of idle gears 33K, 34K, 35K and 36K.

The fourth joint 31K is connected to the developing unit 7K. The fourth joint 31K is rotatable about an axis A4. The axis A4 extends in the axial direction. The fourth joint 31K includes a fourth joint gear 41K rotatable about the axis A4. The fourth joint 31K has a configuration the same as that of the first joint 31Y, and the above description as to the first joint 31Y is applicable.

Hence, description as to the configuration of the fourth joint 31K will be omitted.

The fourth clutch 32K is positioned in the middle of the fourth gear train 23K. Specifically, the fourth clutch 32K is disposed between the idle gear 35K and the idle gear 36K. The fourth clutch 32K is configured to switch power transmission status between a fourth engaging state and a fourth disengaging state. The fourth clutch 32K engages transmission of a driving force to the fourth joint gear 41K when the fourth clutch 32K is in the fourth engaging state. The fourth clutch 32K disengages the transmission of the driving force to the fourth joint gear 41K when the fourth clutch 32K is in the fourth disengaging state.

Specifically, the fourth clutch 32K is an electromagnetic clutch. The fourth clutch 32K is configured to be switched between an ON state and an OFF state. The fourth clutch 32K becomes the fourth engaging state when the fourth clutch 32K is in the ON state. The fourth clutch 32K becomes the fourth disengaging state when the fourth clutch 32K is in the OFF state.

The idle gear 33K is in meshing engagement with the fourth joint gear 41K. The idle gear 34K is rotatable along with the idle gear 33K. The idle gear 35K is in meshing engagement with the idle gear 34K. The idle gear 36K is rotatable together with the idle gear 35K when the fourth clutch 32K is in the ON state.

<2.6 Fifth Gear Train>

The fifth gear train 24 includes a plurality of idle gears 51, 52, 53 and 54. The idle gear 51 is in meshing engagement with the output gear 22 (see FIG. 2). Hence, the fifth gear train 24 is connected to the output gear 22. The idle gear 52 is rotatable together with the idle gear 51.

The idle gear 53 is in meshing engagement with the idle gear 52. The idle gear 54 is in meshing engagement with the idle gear 53. The idle gear 54 is also in meshing engagement with the idle gear 36Y and the idle gear 36M. Accordingly, the fifth gear train 24 is connected to the first clutch 32Y and the second clutch 32M.

<2.7 Sixth Gear Train>

The sixth gear train 25 includes a plurality of idle gears 61, 62, 63 and 64. The idle gear 61 is in meshing engagement with the output gear 22 (see FIG. 2). Accordingly, the sixth gear train 25 is connected to the output gear 22. The idle gear 62 is rotatable together with the idle gear 61.

The idle gear 63 is in meshing engagement with the idle gear 62. The idle gear 64 is in meshing engagement with the idle gear 63. Further, the idle gear 64 is in meshing engagement with the idle gear 36C and the idle gear 36K. Hence, the sixth gear train 25 is connected to the third clutch 32C and the fourth clutch 32K.

Here, all of the gears constituting the sixth gear train 25 are not in meshing engagement with any one the gears constituting the fifth gear train 24. That is, the sixth gear train 25 is independent from the fifth gear train 24.

Accordingly, transmission of torque fluctuation occurring due to switching operation performed in each of the first gear train 23Y and the second gear train 23M to the third gear train 23C and the fourth gear train 23K can be restrained.

<2.8 The Number of Gears Interposed Between Output Gear and Joints>

Figure 3:
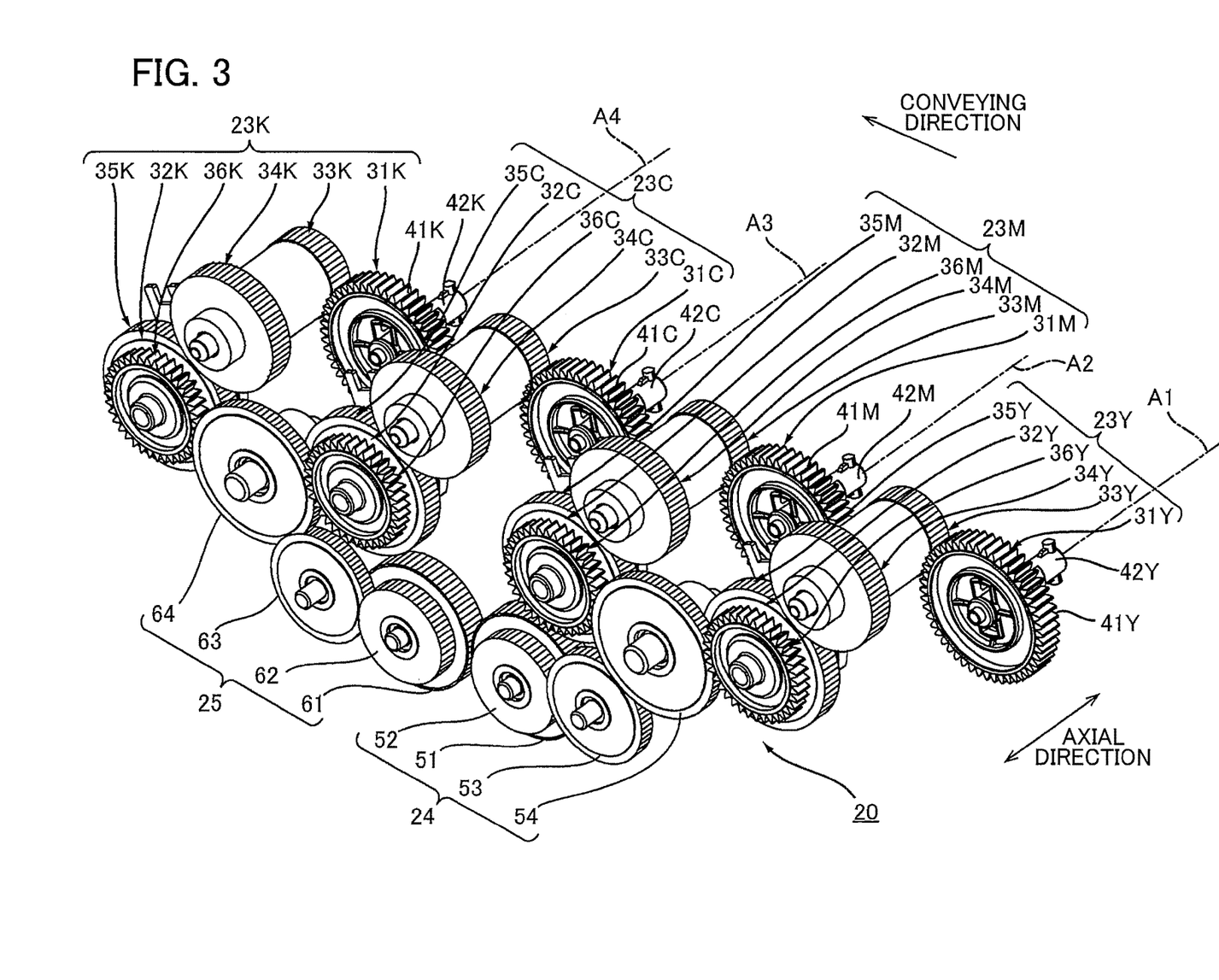
FIG. 3 is a perspective view of the gear trains illustrated in FIG. 2.

As illustrated in FIGS. 2 and 3, the plurality of idle gears 51, 52, 53, 54, 36Y, 35Y, 34Y and 33Y intervenes between the output gear 22 and the first joint 31Y. That is, the number of gears intervening between the output gear 22 and the first joint 31Y is eight.

Further, the plurality of idle gears 51, 52, 53, 54, 36M, 35M, 34M and 33M intervenes between the output gear 22 and the second joint 31M. That is, the number of gears intervening between the output gear 22 and the second joint 31M is eight.

Further, the plurality of idle gears 61, 62, 63, 64, 36C, 35C, 34C and 33C intervenes between the output gear 22 and the third joint 31C. That is, the number of gears intervening between the output gear 22 and the third joint 31C is eight.

Further, the plurality of idle gears 61, 62, 63, 64, 36K, 35K, 34K and 33K intervenes between the output gear 22 and the fourth joint 31K. That is, the number of gears intervening between the output gear 22 and the fourth joint 31K is eight.

That is, the number of gears intervening between the output gear 22 and the first joint 31Y, the number of gears intervening between the output gear 22 and the second joint 31M, the number of gears intervening between the output gear 22 and the third joint 31C, and the number of gears intervening between the output gear 22 and the fourth joint 31K are equal to one another.

With the above configuration, torque transmitted to the four developing units 7Y, 7M, 7C and 7K can be equalized.

<3. Operation in Image Forming Apparatus>

Next, operation performed in the image forming apparatus 1 will be described with reference to FIGS. 1 through 3.

As illustrated in FIG. 1, when printing is performed on the printing medium S in the image forming apparatus 1, the conveyer belt 11 conveys the printing medium S supplied from the sheet supply tray 3 toward the fixing unit 9 through a portion between the transfer unit 8 and the four photosensitive drums 4Y, 4M, 4C and 4K.

Since the four photosensitive drums 4Y, 4M, 4C and 4K are arrayed in the order of the photosensitive drum 4Y, the photosensitive drum 4M, the photosensitive drum 4C and the photosensitive drum 4K in the conveying direction, the printing medium S conveyed by the conveyer belt 11 contacts the photosensitive drum 4M after contacting the photosensitive drum 4Y, contacts the photosensitive drum 4C after contacting the photosensitive drum 4M, and contacts the photosensitive drum 4K after contacting the photosensitive drum 4C. Further, the printing medium S separates from the photosensitive drum 4M after separating from the photosensitive drum 4Y, separates from the photosensitive drum 4C after separating from the photosensitive drum 4M, and separates from the photosensitive drum 4K after separating from the photosensitive drum 4C.

Further, the image forming apparatus 1 successively switches the first clutch 32Y, the second clutch 32M, the third clutch 32C, and the fourth clutch 32K from their ON state to their OFF state in relation to the separation timings of the printing medium S from the respective four photosensitive drums 4Y, 4M, 4C and 4K.

Specifically, the image forming apparatus 1 switches the first clutch 32Y from the ON state to the OFF state after the printing medium S separates from the photosensitive drum 4Y. That is, the first clutch 32Y is switched to the first disengaging state after the printing medium S conveyed by the conveyer belt 11 separates from the photosensitive drum 4Y. Preferably, the image forming apparatus 1 switches the first clutch 32Y from the ON state to the OFF state after the printing medium S separates from the photosensitive drum 4M. Therefore, torque fluctuation generated due to switching operation of the first clutch 32Y can be restrained from affecting image formation using the photosensitive drum 4M.

Then, after the first clutch 32Y becomes the OFF state and after the printing medium S separates from the photosensitive drum 4M, the image forming apparatus 1 switches the second clutch 32M from the ON state to the OFF state. That is, the second clutch 32M becomes the second disengaging state after the first clutch 32Y becomes the first disengaging state and after the printing medium S conveyed by the conveyer belt 11 separates from the photosensitive drum 4M.

Then, after the second clutch 32M becomes the OFF state and after the printing medium S separates from the photosensitive drum 4C, the image forming apparatus 1 switches the third clutch 32C from the ON state to the OFF state. That is, the third clutch 32C becomes the third disengaging state after the second clutch 32M becomes the second disengaging state and after the printing medium S conveyed by the conveyer belt 11 separates from the photosensitive drum 4C. Preferably, the image forming apparatus 1 switches the third clutch 32C from the ON state to the OFF state after the printing medium S separates from the photosensitive drum 4K. This operation can restrain torque fluctuation generated by switching operation of the third clutch 32C from affecting image formation using the photosensitive drum 4K.

Then, after the third clutch 32C becomes the OFF state and after the printing medium S separates from the photosensitive drum 4K, the image forming apparatus 1 switches the fourth clutch 32K from the ON state to the OFF state. That is, the fourth clutch 32K becomes the fourth disengaging state after the third clutch 32C becomes the third disengaging state and after the printing medium S conveyed by the conveyer belt 11 separates from the photosensitive drum 4K.

Through this operation, degradation of the photosensitive drums and the developing rollers can be restrained by halting the operation of the developing units which has already completed transfer of a toner image onto the printing sheet S.

<4. Function and Effect>

As illustrated in FIGS. 2 and 3, in the image forming apparatus 1, the fifth gear train 24 connected to the first clutch 32Y and the second clutch 32M, and the sixth gear train 25 connected to the third clutch 32C and the fourth clutch 32K are connected to the output gear 22 independently from each other.

Accordingly, torque fluctuation generated by the switching operation of the first clutch 32Y and the second clutch 32M is not transmitted to the sixth gear train 25, and therefore the torque fluctuation does not affect rotations of the developing roller 10C (see FIG. 1) and the developing roller 10K (see FIG. 1).

Further, torque fluctuation generated by the switching operation of the third clutch 32C and the fourth clutch 32K is not transmitted to the fifth gear train 24, and hence, the torque fluctuation does not affect rotations of the developing roller 10Y (see FIG. 1) and the developing roller 10M (see FIG. 1).

As a result, disturbance of an image to be printed can be restrained when each of the developing roller 10Y, the developing roller 10M, the developing roller 10C and the developing roller 10K is individually halted during the printing operation.

<5. Modifications>

In the above-described embodiment, the gear trains 20 configured to transmit a driving force to each of the four developing units 7Y, 7M, 7C and 7K are exemplified and a configuration where the first gear train 23Y, the second gear train 23M and the fifth gear train 24 for transmitting the driving force to the developing units 7Y and 7M, and the third gear train 23C, the fourth gear train 23K, and the sixth gear train 25 for transmitting the driving force to the developing units 7C and 7K are connected to the output gear 22 independently from each other is described.

However, the number of developing units is arbitrary. For example, as gear trains for transmitting a driving force to each of two developing units 7M and 7K, a first gear train for transmitting a driving force to one developing unit 7M and a second gear train for transmitting a driving force to the remaining one developing unit 7K may be connected to the output gear 22 independently from each other.

That is, the image forming apparatus 1 may include the first gear train connecting the output gear 22 to the developing unit 7M, and the second gear train independent from the first gear train and connecting the output gear 22 to the developing unit 7K. In this case, the first gear train includes a first clutch, and the second gear train includes a second clutch. Specifically, the first gear train according to this modification corresponds to the second gear train 23M and the fifth gear train 24 according to the above-described embodiment. Further, the second gear train according to this modification corresponds to the fourth gear train 23K and the sixth gear train 25 according to the above-described embodiment. Further, the first clutch according to the modification corresponds to the second clutch 32M according to the above-described embodiment. Further, the second clutch according to this modification corresponds to the fourth clutch 32K according to the above-described embodiment.

Further, in the above-described embodiment, an electromagnetic clutch is exemplified as each of the first clutch 32Y, the second clutch 32M, the third clutch 32C and the fourth clutch 32K. However, a dog clutch and a friction clutch are also available as the first clutch 32Y, the second clutch 32M, the third clutch 32C and the fourth clutch 32K.

Further, although not illustrated, the image forming apparatus 1 may include a single drum unit including the four photosensitive drums 4Y, 4M, 4C and 4K, and four developing cartridges attachable to the drum unit.

Further, although not illustrated, the image forming apparatus 1 may include a first drum cartridge including the photosensitive drum 4Y, a first developing cartridge attachable to the first drum cartridge, a second drum cartridge including the photosensitive drum 4M, a second developing cartridge attachable to the second drum cartridge, a third drum cartridge including the photosensitive drum 4C, a third developing cartridge attachable to the third drum cartridge, a fourth drum cartridge including the photosensitive drum 4K, and a fourth developing cartridge attachable to the fourth drum cartridge.

Further, although not illustrated, the image forming apparatus 1 may include a first process cartridge including the photosensitive drum 4Y and the developing unit 7Y, a second process cartridge including the photosensitive drum 4M and the developing unit 7M, a third process cartridge including the photosensitive drum 4C and the developing unit 7C, and a fourth process cartridge including the photosensitive drum 4K and the developing unit 7K.

While the description has been made in detail with reference to the embodiments thereof, it would be apparent to those skilled in the art that many modifications and variations may be made therein without departing from the spirit of the disclosure.

What is claimed is:

1. An image forming apparatus comprising:
   a first gear train comprising:
      a first joint connected to a first developing unit comprising a first developing roller, the first joint comprising a first joint gear; and
      a first clutch comprising a first gear, the first clutch being configured to switch power transmission status between a first engaging state where the first clutch engages transmission of a driving force to the first joint gear and a first disengaging state where the first clutch disengages the transmission of the driving force to the first joint gear;
   a second gear train comprising:
      a second joint connected to a second developing unit comprising a second developing roller, the second joint comprising a second joint gear; and
      a second clutch comprising a second gear, the second clutch being configured to switch power transmission status between a second engaging state where the second clutch engages transmission of a driving force to the second joint gear and a second disengaging state where the second clutch the disengages transmission of the driving force to the second joint gear;
   a third gear train comprising:
      a third joint connected to a third developing unit comprising a third developing roller, the third joint comprising a third joint gear; and
      a third clutch comprising a third gear, the third clutch being configured to switch power transmission status between a third engaging state where the third clutch engages transmission of a driving force to the third joint gear and a third disengaging state where the third clutch disengages the transmission of the driving force to the third joint gear;
   a fourth gear train comprising:
      a fourth joint connected to a fourth developing unit comprising a fourth developing roller, the fourth joint comprising a fourth joint gear; and
      a fourth clutch comprising a fourth gear, the fourth clutch being configured to switch power transmission status between a fourth engaging state where the fourth clutch engages transmission of a driving force to the fourth joint gear and a fourth disengaging state where the fourth clutch disengages the transmission of the driving force to the fourth joint gear;
   a motor comprising an output shaft;
   an output gear rotatable together with the output shaft;
   a fifth gear train comprising:
      a first idle gear in meshing engagement with the output gear; and
      a second idle gear in meshing engagement with both the first gear of the first clutch and second gear of the second clutch; and
   a sixth gear train comprising:
      a third idle gear in meshing engagement with the output gear; and
      a fourth idle gear in meshing engagement with both the third gear of the third clutch and the fourth gear of the fourth clutch.

2. The image forming apparatus according to claim 1, wherein each of the first clutch, the second clutch, the third clutch, and the fourth clutch is an electromagnetic clutch.

3. The image forming apparatus according to claim 1, wherein the motor is a brushless DC motor.

4. The image forming apparatus according to claim 1, wherein the number of gears intervening between the output gear and the first joint, the number of gears intervening between the output gear and the second joint, the number of gears intervening between the output gear and the third joint, and the number of gears intervening between the output gear and the fourth joint are equal to one another.

5. The image forming apparatus according to claim 1, further comprising:
- a conveyer belt configured to convey a printing medium;
- a first photosensitive drum contacting the first developing roller;
- a second photosensitive drum contacting the second developing roller, the second photosensitive drum being positioned downstream of the first photosensitive drum in a conveying direction in which the printing medium is conveyed by the conveyer belt;
- a third photosensitive drum contacting the third developing roller, the third photosensitive drum being positioned downstream of the second photosensitive drum in the conveying direction; and
- a fourth photosensitive drum contacting the fourth developing roller, the fourth photosensitive drum being positioned downstream of the third photosensitive drum in the conveying direction,
- wherein, after the printing medium conveyed by the conveyer belt separates from the first photosensitive drum, the first clutch becomes the first disengaging state,
- wherein, after the first clutch becomes the first disengaging state and after the printing medium conveyed by the conveyer belt separates from the second photosensitive drum, the second clutch becomes the second disengaging state,
- wherein, after the second clutch becomes the second disengaging state and after the printing medium conveyed by the conveyer belt separates from the third photosensitive drum, the third clutch becomes the third disengaging state, and
- wherein, after the third clutch becomes the third disengaging state and after the printing medium conveyed by the conveyer belt separates from the fourth photosensitive drum, the fourth clutch becomes the fourth disengaging state.

* * * * *

UNITED STATES PATENT AND TRADEMARK OFFICE
CERTIFICATE OF CORRECTION

| | |
|---|---|
| PATENT NO. | : 11,226,578 B2 |
| APPLICATION NO. | : 17/030722 |
| DATED | : January 18, 2022 |
| INVENTOR(S) | : Kotaro Haruta et al. |

It is certified that error appears in the above-identified patent and that said Letters Patent is hereby corrected as shown below:

In the Claims

Column 12, Line 17, Claim 1: Delete "the disengages" and insert --disengages the-- therefor.

Signed and Sealed this
Second Day of August, 2022

Katherine Kelly Vidal
*Director of the United States Patent and Trademark Office*